United States Patent
Gibson et al.

(10) Patent No.: US 12,217,161 B2
(45) Date of Patent: Feb. 4, 2025

(54) CONVOLUTIONAL NEURAL NETWORK HARDWARE CONFIGURATION

(71) Applicant: Imagination Technologies Limited, Kings Langley (GB)

(72) Inventors: Clifford Gibson, St. Albans (GB); James Imber, Hemel Hempstead (GB)

(73) Assignee: Imagination Technologies Limited, Kings Langley (GB)

(*) Notice: Subject to any disclaimer, the term of this patent is extended or adjusted under 35 U.S.C. 154(b) by 166 days.

(21) Appl. No.: 17/498,618

(22) Filed: Oct. 11, 2021

(65) Prior Publication Data

US 2022/0027717 A1   Jan. 27, 2022

Related U.S. Application Data

(63) Continuation of application No. 15/585,645, filed on May 3, 2017, now Pat. No. 11,144,819.

(30) Foreign Application Priority Data

May 3, 2016   (GB) ...................................... 1607713

(51) Int. Cl.
*G06N 3/063*   (2023.01)
*G06F 7/00*   (2006.01)
(Continued)

(52) U.S. Cl.
CPC ............... *G06N 3/063* (2013.01); *G06F 7/00* (2013.01); *G06F 7/5443* (2013.01); *G06N 3/04* (2013.01); *G06N 3/045* (2023.01); *G06N 3/08* (2013.01)

(58) Field of Classification Search
CPC .......... G06N 3/04; G06N 3/045; G06N 3/063; G06N 3/08; G06F 7/00; G06F 7/5443
See application file for complete search history.

(56) References Cited

U.S. PATENT DOCUMENTS 9,190,053 B2   11/2015   Penn et al.
9,424,494 B1   8/2016   Lineback et al.
(Continued)

FOREIGN PATENT DOCUMENTS

CN   102420931 A   4/2012
CN   104915322 A   9/2015
(Continued)

OTHER PUBLICATIONS

Anwar et al., "Fixed Point Optimization of Deep Convolutional Neural Networks for Object Recognition", 2015 IEEE International Conference on Acoustics, Speech and Signal Processing (ICASSP); Apr. 19, 2015, pp. 1131-1135, 2015 (Year: 2015).*

(Continued)

*Primary Examiner* — Marshall L Werner
(74) *Attorney, Agent, or Firm* — Potomac Law Group, PLLC; Vincent M DeLuca

(57) ABSTRACT

A method of configuring a hardware implementation of a Convolutional Neural Network (CNN), the method comprising: determining, for each of a plurality of layers of the CNN, a first number format for representing weight values in the layer based upon a distribution of weight values for the layer, the first number format comprising a first integer of a first predetermined bit-length and a first exponent value that is fixed for the layer; determining, for each of a plurality of layers of the CNN, a second number format for representing data values in the layer based upon a distribution of expected data values for the layer, the second number format comprising a second integer of a second predetermined bit-length and a second exponent value that is fixed for the layer; and storing the determined number formats for use in configuring the hardware implementation of a CNN.

20 Claims, 7 Drawing Sheets

(51) Int. Cl.
*G06F 7/544* (2006.01)
*G06N 3/04* (2023.01)
*G06N 3/045* (2023.01)
*G06N 3/08* (2023.01)

(56) References Cited

U.S. PATENT DOCUMENTS

| | | | |
|---|---|---|---|
| 9,430,829 | B2 | 8/2016 | Madabhushi et al. |
| 9,563,825 | B2 | 2/2017 | Shen et al. |
| 9,619,735 | B1 | 4/2017 | Lineback et al. |
| 2010/0158408 | A1 | 6/2010 | El-Mahdy et al. |
| 2010/0215253 | A1 | 8/2010 | Yamamoto et al. |
| 2011/0029471 | A1 | 2/2011 | Chakradhar et al. |
| 2012/0183224 | A1 | 7/2012 | Kirsch |
| 2012/0191955 | A1 | 7/2012 | Jonsson et al. |
| 2014/0180989 | A1 | 6/2014 | Krizhevsky et al. |
| 2014/0192066 | A1 | 7/2014 | Savransky et al. |
| 2014/0288928 | A1 | 9/2014 | Penn et al. |
| 2016/0026912 | A1 | 1/2016 | Falcon et al. |
| 2016/0062947 | A1 | 3/2016 | Chetlur et al. |
| 2016/0342889 | A1 | 11/2016 | Thorson et al. |
| 2016/0342891 | A1 | 11/2016 | Ross et al. |
| 2016/0342893 | A1 | 11/2016 | Ross et al. |
| 2017/0097884 | A1 | 4/2017 | Werner et al. |
| 2017/0102941 | A1 | 4/2017 | Henry et al. |
| 2017/0103312 | A1 | 4/2017 | Henry et al. |

FOREIGN PATENT DOCUMENTS

| | | |
|---|---|---|
| CN | 105205479 A | 12/2015 |
| GB | 2552242 A | 1/2018 |
| GB | 2554711 A | 4/2018 |
| GB | 2592835 A | 9/2021 |
| JP | H07200259 A | 8/1995 |
| JP | H09261073 A | 10/1997 |
| WO | 9966423 A1 | 12/1999 |
| WO | 2016030230 A1 | 3/2016 |

OTHER PUBLICATIONS

Gupta et al., Deep Learning with Limited Numerical Precision, pp. 1-10, Feb. 2015. (Year: 2015).*
Lin et al., "Fixed Point Quantization of Deep Convolutional Networks", Jan. 7, 2016, pp. 1-15, 2016. (Year: 2016).*
Gysel et al., "Hardware-Oriented Approximation of Convolutional Neural Networks", Apr. 11, 2016, pp. 1-8, 2016. (Year: 2016).*
Judd et al., Reduced-Precision Strategies for Bounded Memory in Deep Neural Networks, Jan. 2016. (Year: 2016).*
Lin et al., "Fixed Point Quantization of Deep Convolutional Networks," Jan. 7, 2016, pp. 1-15.
Gysel et al., "Hardware-Oriented Approximation of Convolutional Neural Networks," Apr. 11, 2016, pp. 1-8.
Anwar et al., "Fixed Point Optimization of Deep Convolutional Neural Networks for Object Recognition," 2015 IEEE Int'l Conference on Acoustics, Speech and Signal Processing (ICASSP), Apr. 19, 2015, pp. 1131-1135.
Gupta et al., "Deep Learning with Limited Numerical Precision," Feb. 2015, pp. 1-10.
Brown et al., "Neural Network Number Systems," Int'l Joint Conference on Neural Networks, pp. 903-907.
Chen et al., "DianNao: A Small Footprint High-Throughput Accelerator for Ubiquitous Machine Learning," https://doi.org/10.1145/2847263.2847267, pp. 269-283.
Qiu et al., "Going Deeper with Embedded FPGA Platform for Convolutional Neural Network," https://doi.org/10.1145/2647263.2847265, pp. 26-34.
Gokhale et al., "A 240 G-ops/s Mobile Coprocessor for Deep Neural Networks, " 2014 IEEE Conference on Computer Vision and Pattern Recognition Workshops, Jun. 23, 2014, pp. 696-701.
Yang et al., "A Systematic Approach to Blocking Convolutional Neural Networks," Jun. 14, 2016, pp. 1-12.
Braga et al. (Performance, Accuracy, Power Consumption and Resource Utilization Analysis for Hardware/Software realized Artificial Neural Networks, Sep. 2010, pp. 1629-1636) (Year: 2010).
Laudani et al. (On Training Efficiency and Computational Costs of a Feed Forward Neural Network: A Review, Aug. 2015, pp. 1-13) (Year: 2015).
Lucas (Temporal Difference Learning with Interpolated Table Value Functions, Sep. 2009, pp. 32-37) (Year: 2009).
Yang et al. (Research on Resistor array Non-uniformity Correction with Neural Network, Jul. 2012, pp. 297-302) (Year: 2012).
Anonymous, "Blis Retreat 2015"; Sep. 29, 2015; Retrieved from the Internet: URL:http://www.cs.utexas.edu/users/flame/BLISRetreat2015/program.html; p. 2 "A Systematic Approach for Blocking of Convolutional Neural Networks for Architectures With Hierarchical Memories"; 2 pages.
Conti et al., "A Ultra-Low Energy Convolution Engine for Fast Brain-Inspired Vision in Multicore Clusters", Mar. 2015, pp. 683-688) (Year: 2015).
Pedram, "A Systematic Approach for Blocking of Convolutional Neural Networks for Architectures with Hierarchical Memories"; 3rd BLIS Retreat 2015, Sep. 29, 2015; 51 pages.
Pedram, Convolutional Neural Networks for Architectures With Hierarchical Memories; Sep. 29, 2015; VLSI Research Group Stanford University; pp. 30-46.
Zhang et al, "Optimizing Fpga-Based Accelerator Design for Deep Convolutional Neural Networks"; Proceedings of the 2015 ACM/SIGDA International Symposium on Field-Programmable Gate Arrays, FPGA '15; Feb. 22, 2015; pp. 161-170.

* cited by examiner

FIGURE 6a  FIGURE 6b

CONVOLUTIONAL NEURAL NETWORK HARDWARE CONFIGURATION

RELATED APPLICATIONS AND CLAIM OF PRIORITY

This application is a continuation under 35 U.S.C. 120 of copending application Ser. No. 15/585,645 filed May 3, 2017, which claims foreign priority under 35 U.S.C. 119 from United Kingdom Application No. 1607713.3 filed May 3, 2016.

BACKGROUND

A Convolutional Neural Network (CNN) is a type of artificial neural network that can be used for machine learning applications. In particular, a CNN can be used in signal processing applications, including image processing and computer vision applications.

CNNs have been implemented in applications where power resources are not a significant factor. Despite this, CNNs have application in a number of different technical fields in which the resources of the hardware used to implement the CNNs is such that power consumption, processing capabilities, or silicon area are limited.

There is therefore a need to implement hardware that is configured to implement a CNN in an efficient manner, i.e. in a manner that requires less silicon area or less processing power when operating. Moreover, the definition of a CNN for a particular application may vary over time. For example, additional training may result in the definition of the CNN altering. There is therefore also a need for hardware for implementing a CNN to be flexible to the changing requirements of a CNN.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of configuring a hardware implementation of a Convolutional Neural Network (CNN), the method comprising: determining, for at least one weight of at least one layer of the CNN, a first number format for representing that weight in the at least one layer based upon a distribution of weight values for the at least one layer, the first number format comprising a first integer of a first predetermined bit-length and a first exponent value.

The method may further comprise determining, for each of a plurality of layers of the CNN, a second number format for representing data values in the layer based upon a distribution of expected data values for the layer, the second number format comprising a second integer of a second predetermined bit-length and a second exponent value that is fixed for the layer.

The method may further comprise determining, for each of a plurality of layers of the CNN, a third number format for representing weight values in the layer based upon a distribution of weight values for the layer, the third number format comprising a third integer of a third predetermined bit-length and a third exponent value that is fixed for the layer.

The method may further comprise storing the determined number formats for use in configuring the hardware implementation of a CNN.

There is provided a method of configuring a hardware implementation of a Convolutional Neural Network (CNN), the method comprising: determining, for at least one layer parameter of a CNN, a number format for representing the layer parameter based upon a distribution of layer parameter values for at least a portion of at least one layer, the number format comprising a first integer of a first predetermined bit-length and a first exponent value.

There is provided a method of configuring a hardware implementation of a Convolutional Neural Network (CNN), the method comprising: determining, for each of a plurality of layers of the CNN, a first number format for representing weight values in the layer based upon a distribution of weight values for the layer, the first number format comprising a first integer of a first predetermined bit-length and a first exponent value that is fixed for the layer; determining, for each of a plurality of layers of the CNN, a second number format for representing data values in the layer based upon a distribution of expected data values for the layer, the second number format comprising a second integer of a second predetermined bit-length and a second exponent value that is fixed for the layer; and storing the determined number formats for use in configuring the hardware implementation of a CNN.

There is provided a computer system for configuring a hardware implementation of a Convolutional Neural Network (CNN), the computer system configured to: determine, for each of a plurality of layers of the CNN, a first number format for representing weight values in the layer based upon a distribution of weight values for the layer, the first number format comprising a first integer of a first predetermined bit-length and a first exponent value that is fixed for the layer; determine, for each of a plurality of layers of the CNN, a second number format for representing data values in the layer based upon a distribution of expected data values for the layer, the second number format comprising a second integer of a second predetermined bit-length and a second exponent value that is fixed for the layer; and store the determined number formats for use in configuring the hardware implementation of a CNN The above methods and systems may be embodied in hardware on an integrated circuit. There may be provided a method of manufacturing, at an integrated circuit manufacturing system, a hardware implementation of a CNN. There may be provided an integrated circuit definition dataset that, when processed in an integrated circuit manufacturing system, configures the system to manufacture a hardware implementation of a CNN. There may be provided a non-transitory computer readable storage medium having stored thereon a computer readable description of an integrated circuit that, when processed, causes a layout processing system to generate a circuit layout description used in an integrated circuit manufacturing system to manufacture a hardware implementation of a CNN.

There may be provided an integrated circuit manufacturing system comprising: a non-transitory computer readable storage medium having stored thereon a computer readable integrated circuit description that describes the hardware implementation of a CNN; a layout processing system configured to process the integrated circuit description so as to generate a circuit layout description of an integrated circuit embodying the hardware implementation of a CNN; and an integrated circuit generation system configured to manufacture the hardware implementation of a CNN according to the circuit layout description.

There may be provided computer program code for performing a method as claimed in any preceding claim. There may be provided non-transitory computer readable storage medium having stored thereon computer readable instructions that, when executed at a computer system, cause the computer system to perform the method as claimed in any preceding claim.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 6a and 6b respectively show example weight value distributions before and after weight tuning;

Figure 1:
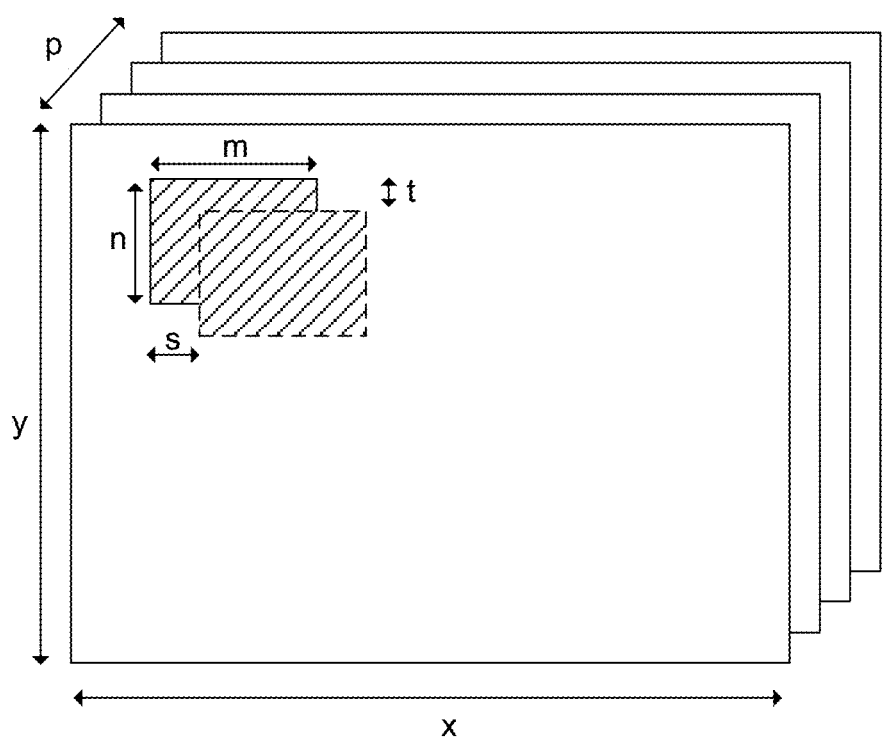
FIG. 1 shows an example of the structure of data used in a Convolutional Neural Network.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A Convolutional Neural Network (CNN) is a form of artificial neural network comprising a plurality of interconnected layers having weights associated therewith to enable the CNN to perform signal processing tasks, including computer vision tasks. The functionality of the CNN is entirely represented by the weights. In some examples, a CNN may be configured to receive an input image.

An example overview of the format of data utilised in a CNN is illustrated in FIG. 1. As can be seen in FIG. 1, the format of data used in a CNN may be formed of a plurality of planes. The input data may be arranged as P planes of data, where each plane has a dimension x×y. The CNN comprises a plurality of layers each of which has associated therewith a plurality of filters $w_0 \ldots w_n$. The filters $w_0 \ldots w_n$ each have a dimension m×n×P and are be applied to the input data according to a convolution operation across a number of steps in direction s and t, as illustrated in FIG. 1.

As mentioned above, each layer may have associated therewith a plurality of filters $w_0 \ldots w_n$. As used herein, the weights may also be referred to as filters, filter weights, or coefficients. The number and value of filter weights may vary between layers such that for a first layer, the number of weights may be defined as $w_0^1 \ldots w_{n1}^1$ and for a second layer, the number of weights may be defined as $w_0^2 \ldots w_{n2}^2$, where the is number of weights in the first layer is n1 and the number of weights in the second layer is n2.

For a plurality of layers of the CNN, the input data for that layer is processed by convolving the input data for that layer using the weights associated with that layer. For a first layer, the 'input data' can be considered to be the initial input to the CNN, which may in some examples be an image—for example, where the CNN is being utilised for vision applications. The first layer processes the input data and generates a first set of intermediate data that is passed to the second layer. The first set of intermediate data may also take the form of a number of planes of data. The first set of intermediate data can be considered to form the input data for the second layer which processes the first intermediate data to produce output data in the form of second intermediate data. Where the CNN contains a third layer, the third layer receives the second intermediate data as input data and processes that data to produce third intermediate data as output data. Therefore reference herein to input data may be interpreted to include reference to input data for any layer. For example, the term input data may refer to intermediate data which is an output of a particular layer and an input to a subsequent layer. This is repeated until the final layer produces output data that can be considered to be the output of the CNN.

Figure 2:
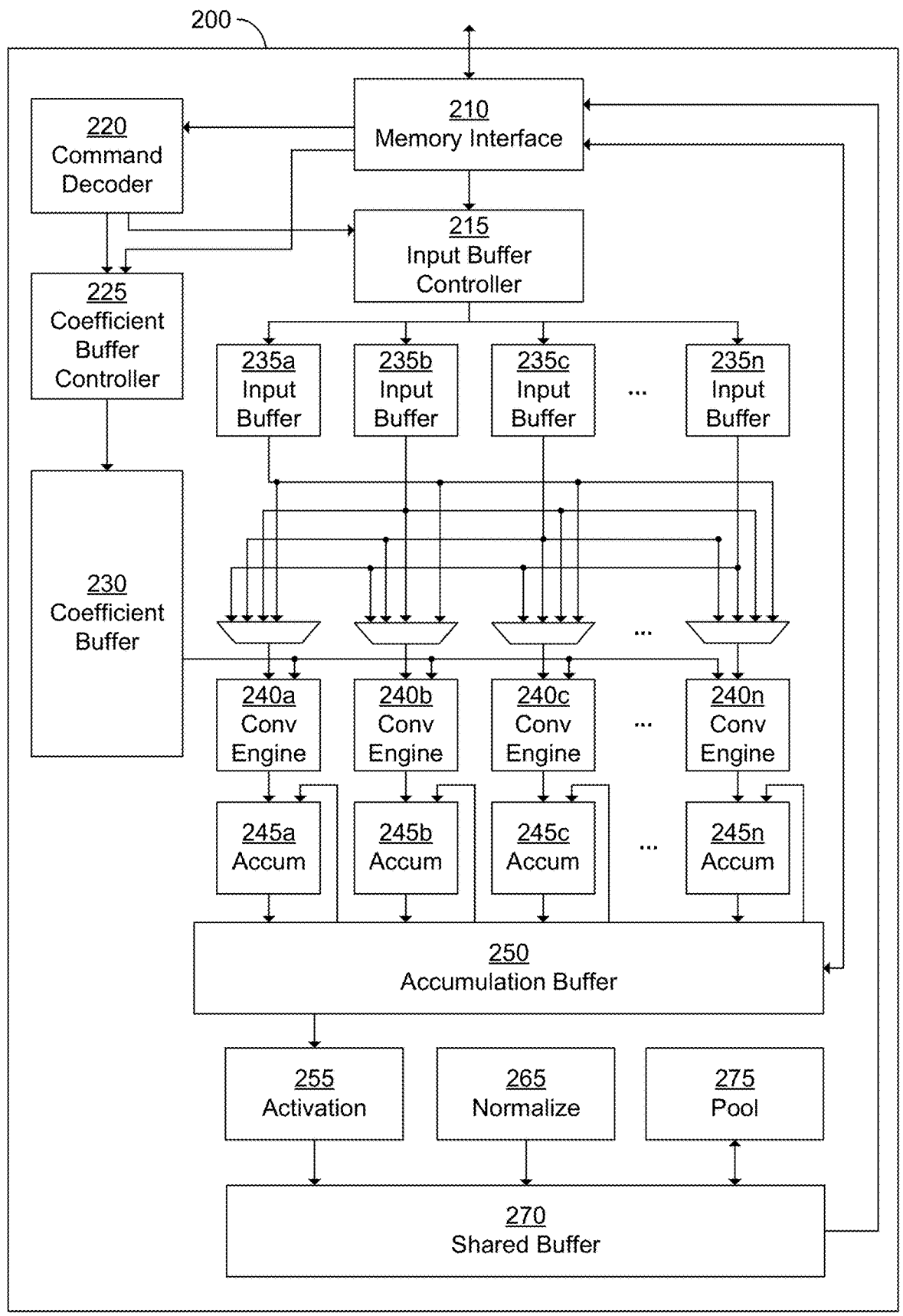
FIG. 2 shows an example hardware implementation of a Convolutional Neural Network.

FIG. 2 illustrates a hardware implementation 200 configured to implement a CNN according to the present disclosure. The hardware implementation comprises digital logic circuitry that is configured to receive data that defines the CNN to be implemented and is configured to operate, in accordance with that data definition, to process input data so as to implement the CNN. The hardware implementation may therefore be considered to be configurable hardware for implementing one or more CNNs. In this way, reference herein to a hardware implementation of a CNN is reference to hardware that is configured to implement a CNN by operating on input data in accordance with received configuration data. The hardware implementation itself is not necessarily configured to implement a specific CNN and is not necessarily pre-loaded with specific configuration data for the CNN. For example, the CNN does not need to include pre-loaded (or hard-coded weight data and layer definitions). The hardware implementation is therefore configured to implement any CNN based on the configuration data it receives. As such, the configuration data (also referred to herein as command data) defines the specific CNN to be implemented, including the number of layers to be included and the size and values of weight data, as well as the expected format of input data.

The data that defines the CNN and how the CNN is to be processed may comprise configuration (or command) data, weight data, and input data. The hardware implementation is configured to process the input data using the weight data in order to perform the operations defined by the CNN. The hardware implementation 200 comprises a memory interface 210, an input buffer controller 215, a command decoder 220, a coefficient buffer controller 225, a coefficient buffer 230, n convolution engines 240, n accumulators 245, an activation module 255, a normalize module 265, a shared buffer 270, and a pool module 275.

The memory interface 210 is configured to provide an interface between the hardware implementation 200 and external memory (not shown). The external memory may be considered as a separate module to the hardware implementation 200 or may be considered to be integrated with the hardware 200. The command or configuration data may, for example, comprise information regarding the size and/or format of the weight and input data size and format as well as their location in the external memory.

The memory interface 210 is configured to receive, from external memory, weight data and input data to be used in calculations within the CNN, as well as command information to control the operation of the hardware implementation 200. The received weights (also referred to herein as coefficients) are passed to the coefficient buffer controller 225 and the received input data is passed to the input buffer controller 215. The received commands are passed to the command decoder 220, which, in turn, is configured to decode the commands and subsequently issue control information to elements of the hardware implementation, including the coefficient control buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory in a single read from the memory (for example using a burst read).

In practice, the number of weights and data received in a single read from external memory will depend upon the size of the coefficient buffer 230 and the input buffer 235. The weights are passed from the coefficient buffer controller 225 to the coefficient buffer 230 and the data received is passed from the input buffer controller 215 to a plurality of input buffers 235a-235n. The number of input buffers will depend upon the specific implementation of the hardware 200 but may take any value. The input data is shared across all of the input buffers 235a-235n. The input buffers each form an effective bank such that the number of input buffers can be increased or decreased depending on the application.

Figure 3:
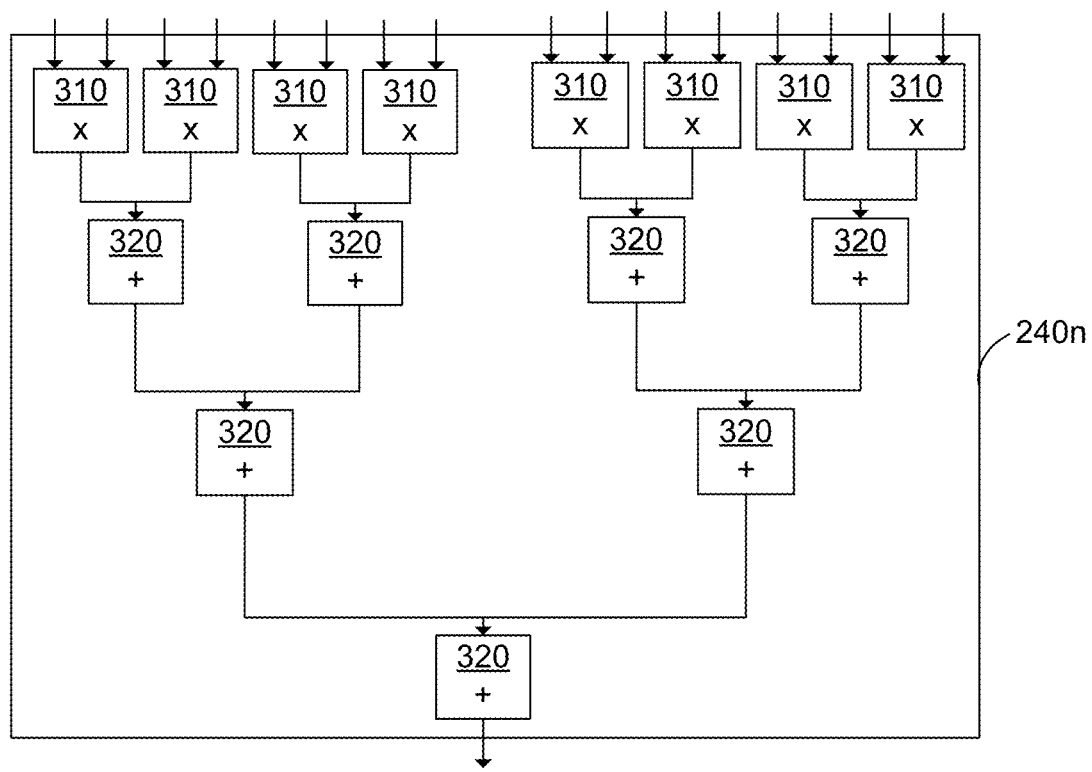
FIG. 3 shows an example of a convolution engine illustrated in FIG. 2.

The input buffers 235a-235n are connected to each of a plurality of multiplexers since each convolution engine 240a-240n requires access to all of effective 'banks' of the input data. The multiplexers are each configured to select an output from one of the input buffers and to pass the values output from the selected input buffer to a respective convolution engine 240a-240n. In addition, weights from the coefficient buffer 230 are provided as a second input into each convolution engine 240a-240n. The convolution engines are configured to perform a convolution operation on the received input data using the weights received from the coefficient buffer 230. The resultant output of each convolution engine 240a-240n is provided as an input to a respective accumulator of a plurality of accumulators 245a-245n. An example implementation of a convolution engine 240n is illustrated in FIG. 3, which comprises a plurality of elements of multiply logic 310 and a plurality of elements of addition logic 320.

Each accumulator 245a-245n is connected to an accumulation buffer 250. The accumulation buffer 250 is configured to store accumulated results received from each accumulator 245a-245n. The accumulation buffer 250 is connected to the memory interface 210. As such, the accumulation buffer 250 is configured to send and receive data to and from external memory via memory interface 210. Specifically, the accumulation buffer 250 is configured to be able to store and restore its values from the external memory via memory interface 210, as will be described in more detail below. The accumulation buffer 250 is connected to the input of the accumulators 245a-245n and is configured to feed values back into the accumulators 245a-245n to accumulation calculations to take place.

In an aspect of this application, there is described below a process of generating configuration data and reformatted input data for use in a hardware implementation of a CNN.

Fixed Point Format

In general, software tools are used during the training phase of a CNN to produce a set of weights per layer based upon a training data set. In some arrangements, some of the weight values in some layers could be generated by other means, for example wavelet bases.

The weights produced by many common software tools for training neural networks are typically generated in a floating point number format. A hardware implementation of a CNN that is configured to implement the CNN by performing floating-point operations can be large in silicon area and have significant power consumption due to the complexity of hardware configured to implement floating point calculations, when compared with hardware for implementing corresponding fixed-point calculations.

In order to reduce the area, power consumption and memory bandwidth of CNN is hardware implementations, it is desirable to convert these floating point values that define the networks to a fixed-point format which require much simpler logic to process than corresponding calculations in a floating-point format. In addition, the inventors have recognised that the number of bits used to represent values for the CNN in each layer of the CNN can be reduced without significant loss of precision. For example, it is possible to represent weights and input data using the same number of bits. However, the size and number of filters, as well as the size of the data, typically varies between layers. As such, a traditional fixed-point number format may be inappropriate for use in CNN implementations since such numbering formats may result in redundant bits in some layers, since the value ranges of input and weight values may vary between layers. Moreover, the inventors have recognised that the range of values to be represented in each layer may vary between layers, thus providing scope for optimising the precision of the represented numbers, for example on a per-layer basis.

In general, a floating point number format consists of a sign bit s, an exponent e, and a mantissa m in the range of 1 to 2. Finite values in floating point format are represented as $(-1)^s 2^e m$. Floating point numbers can represent values over a large range with precision proportional to the size of the number. In floating point numbers, the role of the exponent can be considered to be to move the position of the binary point of the represented number, hence the name "floating" point.

By contrast, a fixed point number has a consistent precision over the interval of values that it is able to represent. A common approach for representing a number in fixed point format is the use of the Q format, which specifies a predetermined number of integer bits n and fractional bits m. Accordingly, a number can be represented as Qn.m, which requires a total of n+m+1 bits (including the sign bit). Example Q formats are illustrated in the table below.

| Q Format | Description | Example |
| --- | --- | --- |
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value being represented in Q format. For example, the first two bits of the representation do not contribute to the final number since they represent 0.5 and 0.25 respectively and therefore fall outside of the required range. However, they are used to indicate the value of the third bit position (i.e. 0.125) and beyond due to the relative bit positions.

Similarly, if we assume in an example that the range [−64,64) needs to be represented to 4 bits of precision. A Q format of Q7.0 will have to be used in order to represent the required example values in Q format. However, the last three bits (i.e. the three least significant bits) of the number do not convey any useful information since these bits represent values outside of the required precision. Put another way, to represent the range −64 to 64, seven bits are needed (since $2^7$ is 128). However, since only four bits of precision are required (i.e. $2^4$ values are to be identified), the remaining LSBs provide superfluous levels of precision. However, these LSB bits must be used because the MSBs must be in index position 7 to represent the full range of values. The Q format described above can therefore be considered to be an inefficient number format for use within a hardware implementation of a CNN since some bits do not convey useful information.

A different number format is therefore set out below for use in hardware implementations of a CNN to store values, including weight values and data values. By recognising that the range of values to be represented for a particular layer can be fixed, it is possible to define a common format to be shared by all input data or all weight data in a particular layer. This means it is not necessary to use a number format that indicates the range of values to be represented to be used, which allows for the precision in representing the number to be optimised as will be described below.

The number format set out below has application beyond CNNs but has particular application in relation to CNNs due to a layer of input/weight data typically falling within a determinable range of values. As mentioned above, the weights that are generated by training a CNN are typically produced in floating point format. However, in order to generate an efficient hardware implementation (in terms of silicon, power consumption, or processing power) it is preferable for the hardware to be implemented in a fixed point format. In this way, it is preferable to convert the values from a floating point format whilst minimising the impact on the accuracy of the CNN output.

In some hardware implementations of a CNN, it is desirable to define a first fixed number of bits that are used to represent each weight and a second fixed number of bits that are used to represent data within the CNN. By predefining the number of bits used to represent the data and weights within the CNN, it is possible to optimise a hardware implementation. For example, the multiply and accumulation operations performed in the convolution engine can be optimised for the number of bits that are to be combined, which will be described in further detail later.

Moreover, in CNN implementations it is typical for the distribution of values for both the weights and the data to vary between layers. In addition, the values for the weights may differ from the values for the data within a particular layer. Given a fixed number of bits to represent weights and data within the CNN, It is preferable to define a separate fixed point format for each of the weights and data within each layer.

Figure 4:
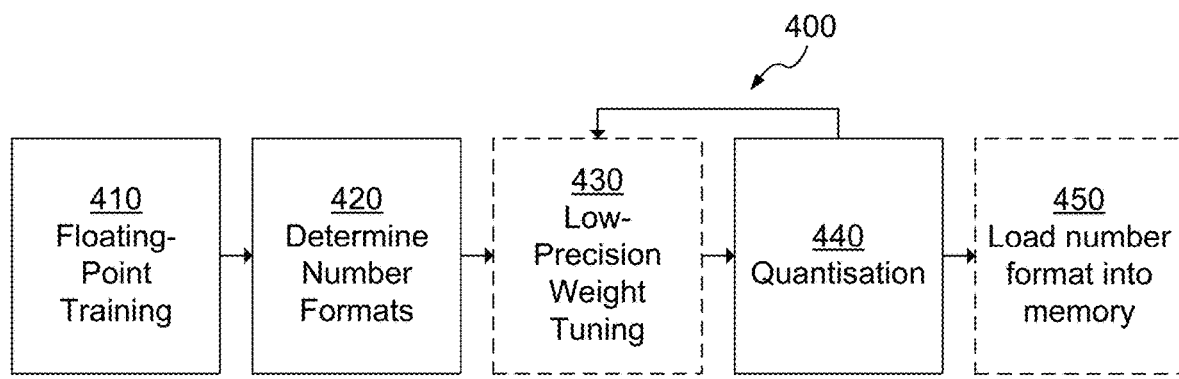
FIG. 4 shows an example process for configuring a hardware implementation of a Convolutional Neural Network for use.

The method of FIG. 4 describes an approach for generating configuration data for a CNN and defining number formats for use in performing the convolution. The defined number format is used to represent values in a hardware implementation of a CNN. The method begins at step 410 at which training of the CNN is performed using floating-point numbers to generate weight data defining the CNN. At step 420, the fixed-point number format for the weight data and the fixed-point number format for the input data to be used in a hardware implementation of a CNN are determined. At this step, the ranges of weight and input data are assessed for each layer. A number format for the weight data of each layer and a number format for the input data of each layer is determined. At step 430, optional low-precision weight tuning is performed to modify weight values of the CNN represented using the number formats determined at step 420 based on the training process that is performed at step 410. As a result modified weight values may be generated, as described in more detail below. At step 440, a quantisation step is performed to convert weight values and/or input data from values representable using the floating point number format to values representable using the fixed point number format determined at step 420.

At step 410 of FIG. 4, a training phase of the CNN is performed. The training phase typically involves optimisation of the weight values of each of the layers of the CNN based upon a training data set. As a result of the training phase, a set of weights that define layers of the CNN is produced and stored. The training phase may be performed prior to and separately from the generation of the hardware implementation of the CNN. For example, a separate physical device may be used to perform the training of the CNN. The generation of the hardware implementation of the CNN may be influenced by knowledge of the values used to define the CNN.

For example, the size and number of the weights may influence the size of the coefficient buffer and the input buffers to be implemented in the hardware implementation of the CNN. The training phase is typically performed in a floating-point number format, such that the generated weights are floating-point numbers.

Figure 6C:
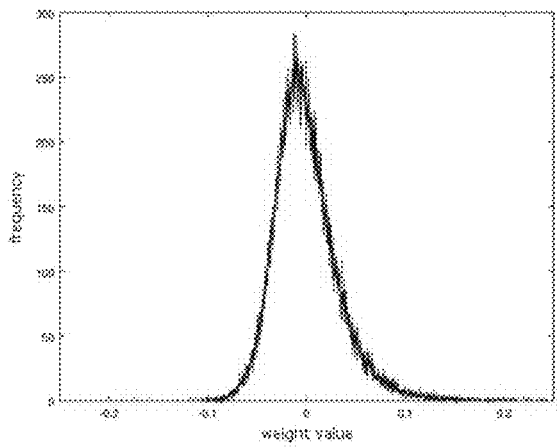
FIG. 6c shows an example process of determining number formats for a layer according to a step of the process of FIG. 4.
Figure 6C:
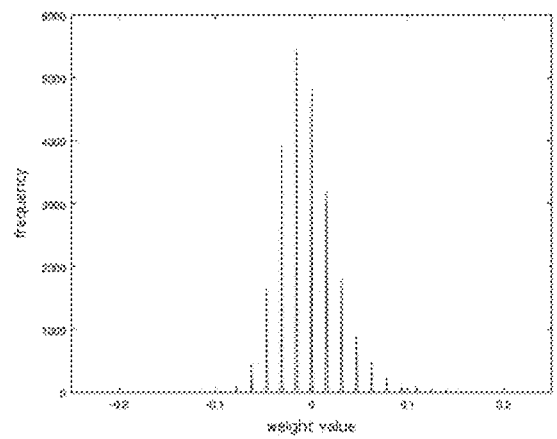
Figure 6C:
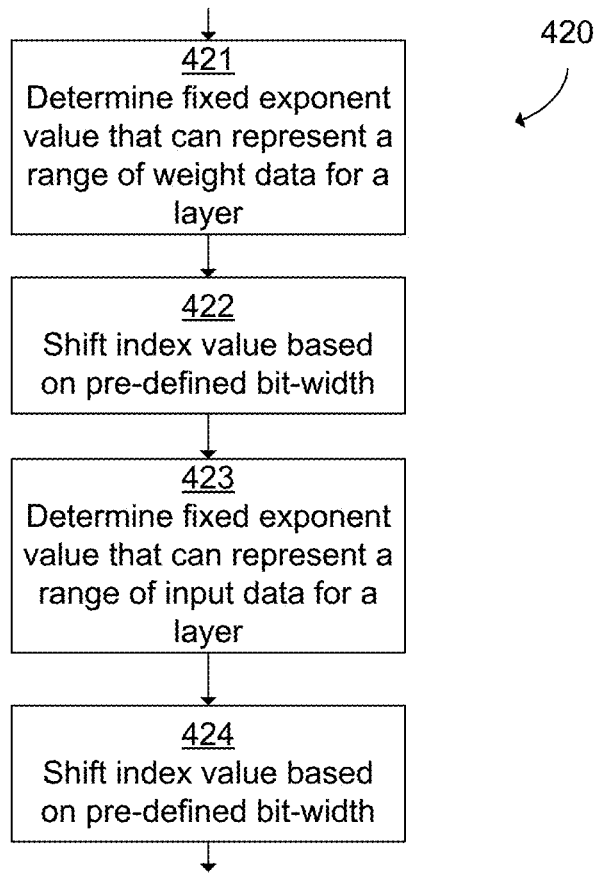

Having produced the floating-point weights that define the CNN, the method proceeds to step 420. At step 420, the number format to be used in each layer for weight data and for input data is determined. The process performed at step 420 is described in more detail with respect to FIG. 6c, which describes a process of identifying the number formats for a particular layer. The process of FIG. 6c is therefore repeated for each layer of the CNN. In general, at step 420 weight and data range selection is performed and this range is used to determine the number formats.

At step 421 the range of values of the weights that are to be used in the CNN (and were generated at step 410) for each of the layers is analysed in order to obtain an estimate of the range (i.e. the distribution) of filter weight values for each layer. In addition, a corresponding analysis of typical input data values is analysed to estimate a distribution of input data values for each layer. The estimated distributions of the weight and input data values are used to determine an optimised number format for use in representing the weight and input data values for each layer. The estimated distribution of the input data values may be based, for example, on the training data set or a known sample of typical inputs for use in the CNN. Where the CNN is to be used for vision applications, the input data used to estimate the distribution of typical inputs may take the form of sample input images.

In order to determine the range of values to be represented by the fixed-point number formats, statistical analysis of the weight and data may be performed in order to obtain information relating to the distribution of the weight and data used in each layer.

A separate fixed-point number format is determined for the weight data and the input data for each layer. As mentioned previously, the input data for a layer is formed of the output of a previous layer (for all but the first layer). The range of values for a layer may therefore differ and thus the number formats may differ between layers. In some arrangements, a common fixed-point number format may be shared between layers.

At step 421, a fixed exponent value is determined for the weights of a layer. The fixed-point number format that is to be used in the hardware implementation of the CNN (and which is described in more detail below) uses a signed integer mantissa and a common fixed power-of-two exponent. The fixed-point format is defined by the number of integer bits and the exponent. Whilst the type of signed integer used may vary between implementations, in this application two's complement is used but other signed number formats may also be used. The number format may also be based on a fixed bit-length mantissa which is set based on a bit-length defined globally.

As mentioned previously, at step 420 of FIG. 4, a number format is determined for weight data and input data of each layer of the CNN. At step 421 of method 420 in FIG. 6c, a fixed exponent is determined that represents a range of weight values for the CNN layer and a fixed exponent that represents a range of input data for the same CNN layer is determined. This will be described in further detail below.

Figure 5A:
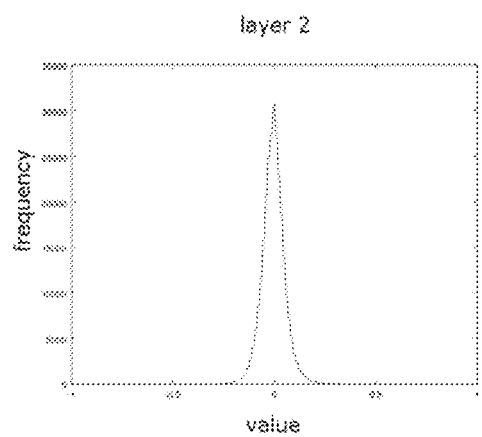
FIGS. 5a and 5b show weight value distributions for example layers of a CNN.
Figure 5B:
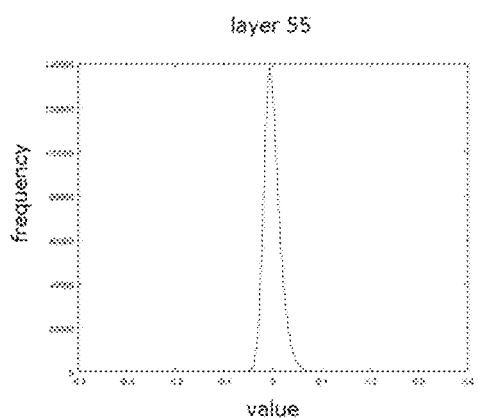

FIGS. 5a and 5b illustrate an example distribution of weight values for a CNN. Specifically, FIGS. 5a and 5b illustrate example histograms of weight values for a CNN, in which the differing spread of weight values can be seen.

FIG. 5a illustrates a distribution of weight values for a second layer (layer 2) of an example CNN to be implemented in the hardware implementation. As can be seen from FIG. 5a, the weight values for layer 2 are centred about a value of zero, and spread from approximately −0.25 to approximately 0.25.

FIG. 5b illustrates another example distribution of weight values across a fifty-fifth layer (layer 55) of the same CNN. The weight values for layer 55 are also centred about a value of zero but have a smaller variance from approximately −0.1 to approximately 0.1. Since the range of weight values for these two layers differs, it is possible to represent the values of weights for layer 2 using a different numbering format to the weights used in layer 55. Given a pre-defined number of bits available to represent the data, the precision provided can depend upon the range of values to be represented.

In order to determine an appropriate number format for the weights of a particular layer, a determination as to the range of values of weights to be represented in a layer is made, as described. The first step at step 421 includes determining an index in a power of 2 (i.e. a fixed exponent value) that would enable the full range of values in the distribution of weights for a layer to be represented. In an example where the weight values for a particular layer are distributed from −0.1 to 0.1, an power of two index of value −3 can be used since $2^{-3}=0.125$ and $-2^{-3}=-0.125$, which would wholly encompass the range of possible values. It will be appreciated that the selected index need not entirely have covered the range of values, but rather may is provide a pre-determined level of acceptable coverage of the range. The precise metric considered will depend on the statistical method used. The skilled person would be aware of different approaches for identifying the range of values to be encompassed. In another example, where the range of values to be represented is −0.25 to 0.25 (as in FIG. 5a), an index value of −2 can be used since $2^{-2}=0.25$ and $-2^{-2}=-0.25$.

In the method described herein, this index value forms an effective "MSB position", which can also be considered to be a "sign" bit in a two's complement mantissa representation, as explained in more detail below.

Having identified the "sign" bit, it is then possible to determine the exponent and mantissa format to be used for the weight values in that layer based upon the number of bits that have been pre-allocated for use in the CNN for the representation of weights/input data across all layers—i.e. globally across the implementation of the CNN in hardware. Put another way, a global fixed number of bits is defined across the entire CNN and is used to determine the number format for representing the weights in each layer. In the following example, it is assumed that the number of bits allocated across the entire network for representing weights is 4 bits. Other example CNN implementations may use a different numbers of bits.

The method 420 of FIG. 6c proceeds from step 421 to 422 at which the fixed exponent value determined at step 421 is shifted. Step 422 includes counting (or put another way shifting) a number of indices to the right of the "sign" bit. Specifically, the indices are counted (or shifted) n−1 (where n is the number of bits pre-defined for storing weight values within the CNN—e.g. 4 bits) values to the right in order to identify an "LSB index" which is the index value reached. In this example, the "LSB index" is −6 as illustrated below, where n=4.

| MSB "sign" | | | LSB |
|---|---|---|---|
| $-2^{-3}$ | $2^{-4}$ | $2^{-5}$ | $2^{-6}$ |

The value of the "LSB index" can be used to define an exponent value of a fixed-point representation of the number, namely: integer*$2^e$.

Having performed the shift of the index value, the exponent e of the above number format is set to be the shifted LSB index determined by shifting the index based on the pre-defined number of bits to be used to represent values in the CNN. The number format can therefore be defined by the shifted exponent value and the number of bits to be used for the value integer. The value integer represents an integer value stored using n bits, where n is the pre-defined number of bits used to store weight and/or input data (e.g. a globally defined number of bits). For a value to be converted into the fixed number format, the value of the integer component of the value is calculated based on the determined e of the number format.

In an example provided in the table above, e=−6 and integer is fixed as being represented using a 4 bit integer. Accordingly, 4 bits may be used to determine a value which is then to be multiplied by $2^e$. Using the example set out above, a floating point value of '0.078125' may need to be represented. Using the example numbering format defined above where e=−6 and integer includes 4 bits, the value '0.078125' can be represented using bits '0101'. This value is identified by multiplying the value of 0101 in two's complement, i.e. the value 5, with the value $2^e$ (i.e. $2^{-6}$) to give 0.078125.

Similarly, using the same example where e=−6 the floating point value of '−0.046875' can be represented using only four bits '1101' in two's complement, i.e. the value −3. As will be appreciated, a number of different weight values for a given layer can be represented using the same number format. Similarly, the number of bits n to be used to represent the integer component may be globally defined. Since the exponent value e of the number format is common across all weights for a particular layer, it is only necessary to store the exponent value to define the number once for that layer. Similarly, it is only necessary to store the number of bits n once. As such, the exponent value e does not need to be stored each time the value of a data point (e.g. a weight or an input data item) itself is stored. In addition, each weight or input data value within that layer may be allocated the number of pre-defined bits n, which is smaller than the number of bits used to represent the same value in the Q format. Other integer (mantissa) representations are possible (such as sign and magnitude), but two's complement is used in the examples described herein.

For each layer, an exponent value (also referred to herein as an LSB value) can be determined and stored. In addition, the values of the weights for each layer may be quantised into one of the values defined by the new number format. This will be described later. With reference to the previously described hardware implementation, the LSB value (exponent value) for each layer may be stored in external memory and passed to the command decoder so as to allow the command decoder to control the hardware implementation by passing the values to the convolution engines as will be described in further detail later.

Returning to FIG. 6c, at step 422 the fixed exponent used to represent a particular value range for a layer have been identified for the weight data and the exponent value has been shifted to define the number format for weight values. The process described above is then repeated for the range of input data values. For example, a fixed exponent value for the input data values is determined based on the range of input data values for a particular layer at step 423. The determined exponent value is then shifted based on the globally defined bit width at step 424 to define the number format for the input data values for that layer.

The process of FIG. 6c is repeated until a number of shifted exponent values are determined for each of weight data and input data for each layer. It will be appreciated that a separate exponent value $e_j^w$ is determined for the weight values of each layer j of a plurality of layers, and another separate exponent value $e_j^i$ is determined for the input data of each layer j of a plurality of layers.

Figure 5C:
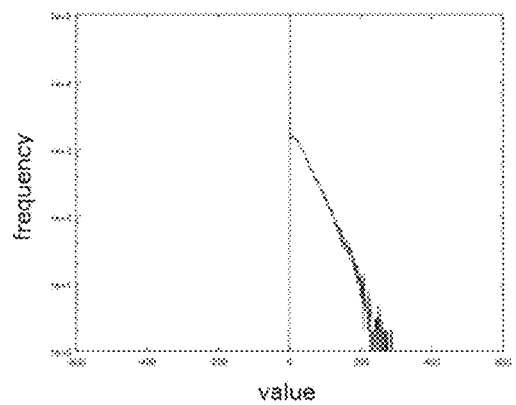
FIGS. 5c and 5d show data value distributions for example layers of a CNN.
Figure 5D:
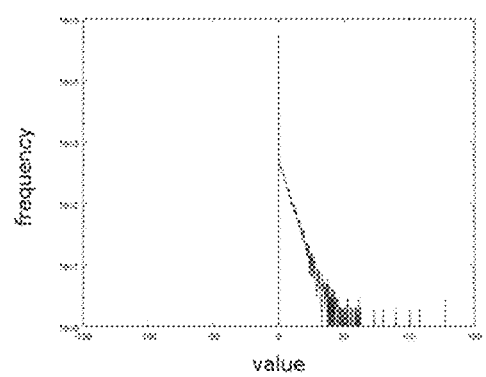

A similar process of converting numbers in floating-point format to a fixed-point format is performed for the input data that is processed in the CNN. Example distributions of data values for layers 2 and 55 are illustrated in FIGS. 5c and 5d, respectively. It will be appreciated that, for the first layer of the CNN, the training data set that is used to perform the training of the CNN may be used to define the LSB value (exponent value) for the first layer. In a similar manner as for the weights, a statistical analysis is performed and the LSB value (exponent value) is determined for each layer.

However, for data to be passed to intermediate layers of the CNN, it is necessary to capture intermediately generated results, i.e. to determine the output values from a layer that form the input values to a subsequent layer. As illustrated in FIGS. 5a and 5b, the distribution of data values in intermediate layers may vary significantly between layers. It is therefore also desirable to optimise the range of the format in the representation of data.

Unlike the determination of the number format for representing values for the weights, the number representation for the data values at each layer can be considered to be based on an estimate as to the expected range of data to be produced at each intermediate layer, since the actual input data during operation is unknown.

One approach for determining the range of values of input data that can be expected at each layer of the CNN is to pass the training data set through the generated CNN and to capture the values generated at each layer. The training data set contains representative input values that give an indication as to the values of expected inputs. From the values captured, an estimate of the range of possible values is made and the method proceeds as set out above in respect of the weights.

Having completed step 420, new number formats are defined for the weights and input data used at each layer of the CNN and the CNN can be implemented in hardware 200 in a manner that conforms to those number formats. To implement the CNN in hardware, the floating-point weights generated at step 410 may be converted into the new number format—for example using a process of quantisation. The new number formats may be stored as configuration data that is loadable by a hardware implementation to define the manner in which values are to be stored or handled within the CNN. For example, by utilising this approach, the hardware implementation 200 of FIG. 2 is able to better utilise the available space in the coefficient and input buffers the number of weight and input data values stored in the respective coefficient and input buffers whilst optimising the precision with which these values are stored. The number of external memory interactions can therefore be reduced.

Quantisation

An optional low-precision weight tuning 430 step may be performed in relation to quantised/converted values. To perform the weight tuning, the floating-point numbers should be quantised according to the determined fixed-point number formats.

Having generated the number formats to be used in the CNN according to step 420 of FIG. 4, quantisation 440 is performed to quantise the weight values that are to be used in the CNN to one of the values representable by the above-described fixed-point number format. Since the weight values represented in the new fixed-point format may have reduced precision with respect to the original floating-point format, quantisation error may arise. The weight values for a particular layer are quantised according to the following equation:

$$\text{fixed}(a) = \begin{cases} X_{max} & \text{if } a \geq X_{max} \\ X_{min} & \text{if } a \leq X_{min} \\ Q(a) & \text{otherwise} \end{cases}$$

In the above equation, the values $X_{max}$ and $X_{min}$ represent respectively the highest and lowest representable numbers in the fixed-point format achieved by clamping. The function $Q(a)$ represents a rounding function, such as the below-described nearest-neighbour rounding function. The above equation quantises values to the nearest available fixed-point number that can be achieved in the new fixed-point number format, and clamps to the closest representable value for inputs outside the range. Rounding towards zero may cause quantisation errors to be compounded as data progresses through the network. Nearest-level rounding reduces quantisation error and compounding of errors.

In an example of the use of nearest-neighbour quantisation, consider two random matrices A and B where all values are drawn from a uniform distribution between −1 and 1. 8-bit fixed-point numbers with an LSB value (exponent value e) of −4 are used. $A, B \in \mathbb{R}^{10 \times 10}$ are the float matrices, and $A_x$, $B_x$ the corresponding 8-bit fixed-point matrices.

$|A_x - A| = 0.183 |A_x B_x - AB| = 0.507$  Nearest-Neighbour $|A_x - A| = 0.378 |A_x B_x - AB| = 1.504$  Round-Towards-Zero Switching from nearest-neighbour to round-towards-zero therefore roughly doubles the difference between the float and fixed-point matrices; however, their product has a much greater error due to the compounding of quantisation errors. This effect is worse still with large matrices and large numbers of matrix multiplies.

Having quantised the weight values of each layer to values that correspond to the new fixed-point number formats (one format for each layer) in step 440, the newly quantised weights are stored in memory accessible by a hardware implementation of the CNN for processing as shown in step 450. For example, the quantised weights are stored in a memory connect to the hardware implementation of the CNN. The hardware implementation 200 of a CNN may then load the weight values from memory when processing each layer and operate upon the weight values in the generated number format.

The number formats per layer for input data are also determined and the input data to the hardware implementation of a CNN, i.e. the input to the first layer of the CNN, is also stored in memory in the determined number format. In some arrangements, data indicating the number formats to be used for the input data of each layer are also stored in memory accessible by the hardware implementation of the CNN. Accordingly, the hardware implementation of the CNN is able to read the number formats for a particular layer. The hardware implementation of the CNN is then able to be configured to process input data according to the number format for the current is layer being processed. Subsequently generated data, i.e. data generated in each layer that forms an input to the subsequent layer, is also handled in the format for that layer based on the number format defined and stored in memory.

Number Arithmetic

The fixed-point numbering format set out above may be used in an integer-based implementation of integer-and-exponent fixed-point arithmetic.

A conversion from a number a in a first fixed-point format to the same number in a second, different format c (i.e. the number of bits and/or the exponent of a differ from that of c) requires an arithmetic shift on the integer and a clamp in the case of overflow. >>e and <<e are right and left shifts by e bits respectively. $a_i$ is the integer part of a and $e_a$ is the exponent of a.

If positive overflow occurs, the result should be clamped to $X_{max}$, and if negative overflow occurs it should be clamped to $X_{min}$. $X_{max}$ is the highest representable number in the fixed-point format and $X_{min}$ is the lowest representable number. In two's complement, $X_{max}$=011 . . . 1 and $X_{min}$=100 . . . 0.

Where the formats (i.e. the number of bits n and exponent e) of the operands a and b, and the result c are all identical, the basic operations are as follows:

|  | Negative Exponent | Positive Exponent |
| --- | --- | --- |
| Addition | $c_i = a_i + b_i$ | $c_i = a_i + b_i$ |
| Subtraction | $c_i = a_i - b_i$ | $c_i = a_i - b_i$ |
| Multiplication | $c_i = a_i b_i \gg (-e)$ | $c_i = a_i b_i \ll e$ |
| Division | $c_i = (a_i \ll (-e))/b_i$ | $c_i = (a_i \gg e)/b_i$ |

All of the above operations are integer operations. In the case of overflow, the number is clamped to $X_{max}$ or $X_{min}$. For multiplication, the exponent of the result can be adjusted instead of shifting the bits, which can be useful when multiplying numbers with different exponents:

|  | Integer | Exponent |
| --- | --- | --- |
| Multiplication | $c_i = a_i b_i$ | $e_c = e_a + e_b$ |

In the case of addition and subtraction of numbers with different formats, the types of operands should first be converted to the type of the result.

Fixed-Point Convolution Layers

Implementing a convolution layer in a low-precision fixed-point format can provide an improved approach to implementing convolution layers in CNNs for a number of reasons. For example, fewer bits need to be transferred to and from the hardware implementation of the CNN from external memory which reduces the memory bandwidth used to operate the hardware implementation of the CNN. The integer arithmetic logic described above can be implemented within the convolution calculation (such as the convolution engine as described above), which reduces the size and complexity of the hardware logic required to implement the convolution operations. Moreover, since the number of bits required to store the weight data and the input data is fewer than with a corresponding floating point number representation or with the above-described Q format fixed point number representation, smaller buffers are needed in the hardware implementation of the CNN. With reference to the above-described hardware implementation of the CNN corresponding to FIG. 2, the coefficient and data buffers, as well as the accumulation buffers, can be made smaller.

Figure 7:
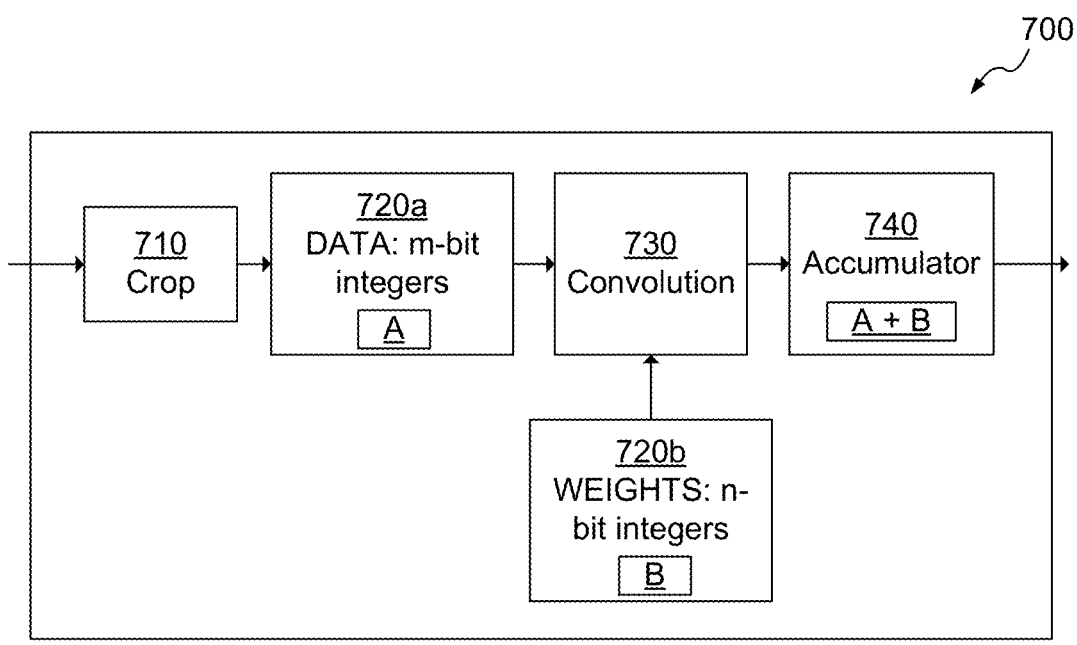
FIG. 7 shows a schematic example of a convolution block configured to perform a convolution using a converted number format.

A schematic example of a convolution block 700 configured to perform convolution calculations in accordance with the generated number formats is illustrated with reference to FIG. 7. The data 720*a* and weight 720*b* indexes that form the exponents of the number format and which are only stored once per layer are sent to the hardware implementation of the CNN before the convolution takes place (the number of weight and data bits, n and m, are assumed to be fixed for the entire network). In the example hardware implementations described above, the exponents of the number formats may be provided as commands to the command decoder 220 and stored for use when required in each layer.

A convolution operation hardware element 730 is configured to perform an inner product between weight and data vectors; in other words, it consists entirely of multiplies and accumulates—as also illustrated with reference to FIG. 3. This can be done in integer arithmetic, and the results stored in the accumulation buffer. The exponent values required for the accumulation buffer can be calculated by adding the exponents from the data and the weights together. Input data has to be put into the correct range depending on the incoming exponent and the data exponent, which is the purpose of the "crop" unit 710 on the input to the layer.

In the above arrangement, the accumulator size will have to be large enough to contain the results of inner products between n-bit and m-bit integers. In an example, the pre-defined, fixed bit length allocated to data A may be 9 bits and allocated to weights B may be 5 bits. In this example, the accumulators would have to be at least 13 bits in size, and possibly much larger depending on the size of the convolution kernel. For each layer, the exponent used to represent the values in that layer may differ. Accordingly, A and B may vary between layers.

Weight Tuning

A method of generating configuration data and defining a number format for use in a hardware implementation of a CNN is set out above. As described above, it is also possible to implement as part of the method of FIG. 4 an optional step of weight tuning 430 by which the weights that define a CNN can be adapted to a low-precision target. Step 430 involves receiving quantised values obtained at step 440 and modifying the weight values by performing further training of the CNN. Tuning the weight values can reduce the classification error of a CNN that is implemented using the fixed-point number representation of the present disclosure. In the example described herein, it is assumed that a pre-trained network defined by a plurality of layers each a plurality of weight values has been prepared using a conventional floating-point software tool, as described above in step 410 of FIG. 4. It is also assumed that the weight and input data exponents in the fixed-point is number format have been determined at step 420 and the pre-defined bit lengths of the weight and data have been set.

Training a CNN (such as the training undertaken in step 410) typically takes place over hundreds of thousands of solver steps (millions in the case of large networks) until classification accuracy is maximised. During each step, the classification error is integrated over a batch (in some applications, 50-100 images) before updating the weights to minimise it, generally using gradient descent or a variant thereof.

In some examples of the present disclosure, the weight tuning is an additional stage of training to provide further weight refinement. The weight tuning training stage requires far fewer steps than the initial floating-point training but enables a reduction in the classification error when using the determined fixed-point number format. It will be appreciated that the effective quantisation from floating-point to fixed-point format may result in a change in the precision of the stored weight values. Depending on the number of bits to be used to represent the weight data, the weight values may be quantised relative to the corresponding floating point representations. A method of weight tuning is used to re-train the CNN based upon the converted weight values.

More specifically, every N steps a subset F of the weights of the CNN are set to their nearest quantisation level using the quantisation method described previously to convert the weight values from a floating-point number format to the fixed-point number format of the present disclosure. In some embodiments, the subset of weights represents a small fraction of the weights. The weights that are quantised may be randomly chosen. The network is then trained further for N steps to reduce the classification error introduced by the quantisation. For a suitable choice of N and F, the quantisation error for the network as a whole is reduced over time whilst maintaining classification accuracy, and the weight histogram converges to the desired comb-like function. FIG. 6*a* illustrates an example distribution of weight values prior to weight tuning and FIG. 6*b* illustrates the example distribution of weight values after weight tuning.

Example pseudo-code for the weight tuning method is set out below:
  for step in [1 . . . MAX_STEPS]
    reduce classification error by floating-point gradient descent
    if(step mod N equals 0)
      quantise (F*NUM_WEIGHTS) of the weights at random The tuned weight values can then be loaded into memory to be accessed by the hardware implementation of the CNN in accordance with step 450 of FIG. 4 above.

It will be appreciated that the methods of generating new number formats described herein are applicable to the hardware implementation set out in FIG. 2. However, the methods described herein are also applicable to other hardware implementations of CNNs, as well as software implementations of CNNs, where fixed point calculations are to be performed. It will also be appreciated that the number formats described herein do not need to utilised throughout the entire CNN and may be used only for portions of the CNN. For example, the number formats may be used for storing the weight and input data values within the internal buffers of the CNN and may be modified or expanded for the purposes of performing calculations.

It will be appreciated that the methods described herein for determining number formats to be used in the CNN are not to be considered as limited to the weight and input data. Indeed, many other layer parameters that are defined on a layer-by-layer basis (or indeed across multiple layers) could be allocated number formats in the manner described above by assessing the distribution of values. For example, biases may be stored in a number format as determined according to the previously described methods. Furthermore, a process of batch normalisation makes use of a scaling factor which could also be applied according to the above methods. Any of the optional features described herein may also apply for these layer parameters.

In addition, whilst the above-described methods are related to determining a fixed is exponent value for an entire layer, the above methods may also be applicable on a per-filter basis, rather than on a per-layer shared exponent. For example, the weights can vary considerably between filters in a layer. By generating some number formats for a first subset of filters and different number formats for a second subset of filters, the number formats are defined in a per-filter rather than a per-layer shared exponent manner. As such, greater accuracy in filters with smaller coefficients is provided since the range is no longer dominated by the filters with the largest coefficients. The per-filter approach may also be combined with the per-layer approach in a blended manner whereby only some layers have a fixed number format and some filters have a fixed number format. The optional features and manner of implementation of this approach corresponds with similar features described above. These approaches may be implemented in the hardware implementation 200 described above.

Figure 8:
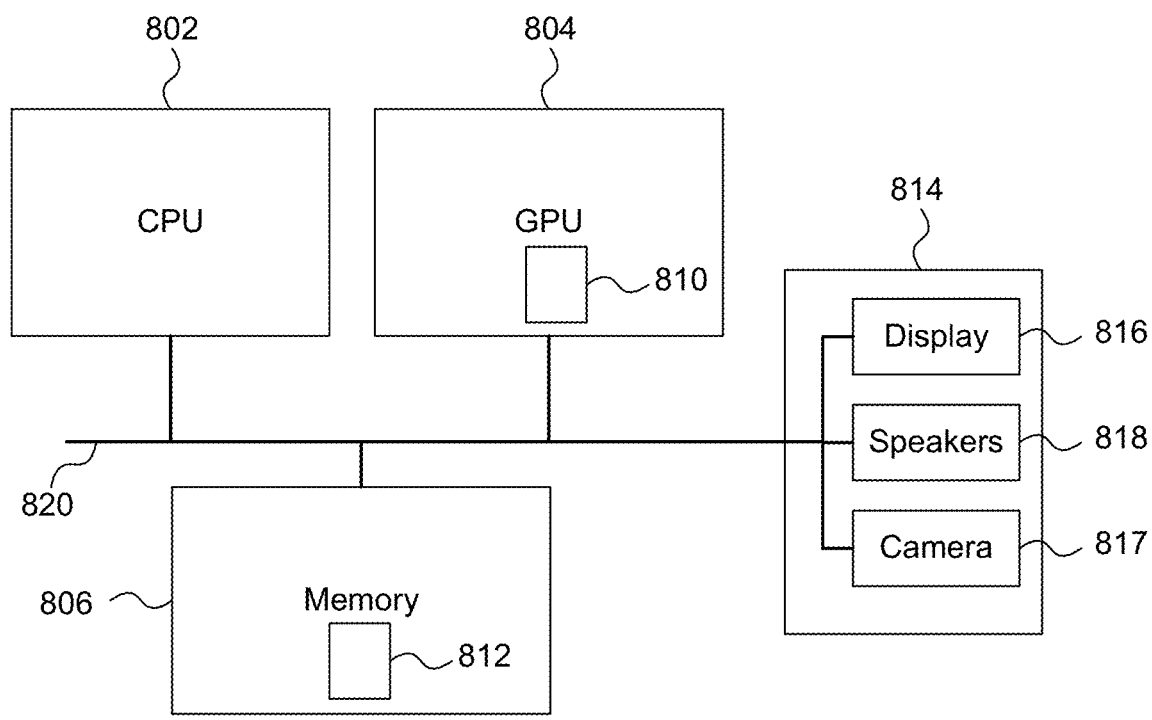
FIG. 8 shows a computer system in which a hardware implementation of a CNN is implemented.

FIG. 8 shows a computer system in which the hardware implementation of a CNN described herein may be implemented. In addition, a computer system such as the computer system of FIG. 8, may be configured to implement the methods of FIGS. 4 and/or 6 in order to store the number formats and/or converted values for use by a hardware implementation of a CNN. It will be appreciated that a computer system configured to implement the methods of FIGS. 4 and/or 6 may differ from a computer system configured to implement the hardware implementation of a CNN as illustrated in FIG. 2.

The computer system comprises a CPU 802, a GPU 804, a memory 806 and other devices 814, such as a display 816, speakers 818 and a camera 817. A processing block 810 is implemented on the GPU 804. In other examples, the processing block 810 may be implemented on the CPU 802. The processing block 810 may also be implemented in a separate unit (not shown). The processing block 810 may comprise digital logic configured to implement the hardware implementation 200. The hardware implementation 200 may be controlled by an external processor, such as the GPU 804 or the CPU 802, or another processor not shown. The components of the computer system can communicate with each other via a communications bus 820. A store 812 is implemented as part of the memory 806.

The hardware implementation 200 of the CNN and the methods for configuring a hardware implementation of the CNN illustrated in FIGS. 1 to 8 are shown as comprising a number of functional blocks. This is schematic only and is not intended to define a strict division between different logic elements of such entities. Each functional block may be provided in any suitable manner. It is to be understood that intermediate values described herein as being formed by a hardware implementation of a CNN need not be physically generated by the hardware implementation of a CNN at any point and may merely represent logical values which conveniently describe the processing performed by the hardware implementation of a CNN between its input and output.

The hardware implementations of a CNN described herein may be embodied in hardware on an integrated circuit. The hardware implementations of a CNN described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a hardware implementation of a CNN configured to perform any of the methods described herein, or to manufacture a hardware implementation of a CNN comprising any apparatus described herein. An integrated circuit definition dataset may be, for example, an integrated circuit description.

Therefore, there may be provided a method of manufacturing, at an integrated circuit manufacturing system, a hardware implementation of a CNN as described herein. Furthermore, there may be provided an integrated circuit definition dataset that, when processed in an integrated circuit manufacturing system, causes the method of manufacturing a hardware implementation of a CNN to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation of a CNN will now be described with respect to FIG. 9.

Figure 9:
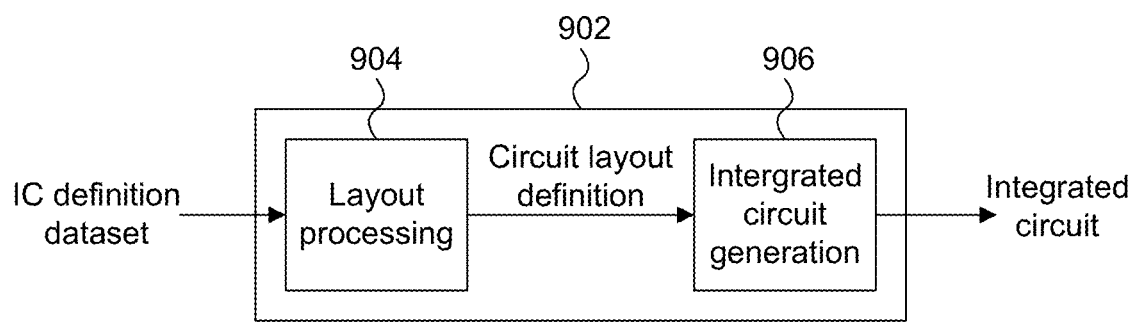
FIG. 9 shows an integrated circuit manufacturing system for generating an integrated circuit embodying a hardware implementation of a CNN.

FIG. 9 shows an example of an integrated circuit (IC) manufacturing system 902 which comprises a layout processing system 904 and an integrated circuit generation system 906. The IC manufacturing system 902 is configured to receive an IC definition dataset (e.g. defining a hardware implementation of a CNN as described in any of the examples herein), process the IC definition dataset, and generate an IC according to the IC definition dataset (e.g. which embodies a hardware implementation of a CNN as described in any of the examples herein). The processing of the IC definition dataset configures the IC manufacturing system 902 to manufacture an integrated circuit embodying a hardware implementation of a CNN as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation of a CNN without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of configuring a hardware implementation of a Convolutional Neural Network (CNN), the method comprising:
   receiving, in a computer system, parameters of a CNN having a plurality of layers, said parameters including weight values and expected data values;
   determining, in the computer system, for each of a plurality of layers of the CNN, a first number format for representing weight values in the layer based upon a distribution of weight values for the layer, the first number format comprising a first integer of a first predetermined bit-length and a first exponent value that is fixed for the layer;
   determining, in the computer system, for each of a plurality of layers of the CNN, a second number format for representing data values in the layer based upon a distribution of expected data values for the layer, the second number format comprising a second integer of a second predetermined bit-length and a second exponent value that is fixed for the layer;
   storing in a computer readable storage medium the determined number formats for use in configuring the hardware implementation of a CNN; and tuning the weight values, the tuning comprising:
selecting, for each of a plurality of layers, a subset of the weight values in that layer, wherein the subset is less than all of the weight values in that layer,
quantising, for each of a plurality of layers, the selected subset of weight values in that layer in accordance with the first number format for that layer to generate modified weight values in that layer, wherein the modified weight values in that layer are less than all of the weight values in that layer, and
training the CNN using the modified weight values to generate tuned weight values.

2. The method of claim 1, wherein the first and second predetermined bit-lengths are each fixed across a plurality of layers of the CNN.

3. The method of claim 1, further comprising converting the weight values for each of the plurality of layers of the CNN into the first number format and converting input data to the CNN into the second number format, wherein the converting comprises performing quantisation based upon the first and second number formats.

4. The method of claim 3, wherein the quantisation is performed based upon nearest-neighbour rounding.

5. The method of claim 3, further comprising storing the converted weight values for each of the plurality of layers of the CNN and data values to the CNN in a memory accessible by the hardware implementation of the CNN or in one or more buffers in the hardware implementation of the CNN.

6. The method of claim 1, further comprising storing the weight values for each of the plurality of layers of the CNN, the storing comprising:
storing, for each weight value, a value representing the first integer of that weight value; and
storing, for each layer, a value representing the first exponent value for that layer.

7. The method of claim 1, further comprising storing the data values for each of the plurality of layers of the CNN, the storing comprising:
storing, for each data value, a value representing the second integer of that data value; and
storing, for each layer, a value representing the second exponent value for that layer.

8. The method of claim 1, wherein the weight values in each layer of the CNN are generated by training the CNN using a training data set and wherein the generated weight values are in a floating-point format.

9. The method of claim 8, wherein the distribution of expected data values is derived from the training data set.

10. The method of claim 1, further comprising determining the first exponent value for each layer by:
identifying a bit index that represents a range of values based upon the distribution of weight values for that layer;
right-shifting the position of the bit index from the identified bit index a number of bits based upon the first predetermined bit-length to identify a first shifted bit index; and
allocating the value of the first shifted bit index as the first exponent value.

11. The method of claim 1, further comprising determining the second exponent value for each layer by:
identifying a bit index that represents a range of values based upon the distribution of expected data values for that layer;
right-shifting the position of the bit index from the identified bit index a number of bits based upon the second predetermined bit-length to identify a second shifted bit index; and
allocating the value of the second shifted bit index as the second exponent value.

12. A computer system for configuring a hardware implementation of a Convolutional Neural Network (CNN), the computer system comprising:
hardware logic configured to determine, for each of a plurality of layers of the CNN, a first number format for representing weight values in the layer based upon a distribution of weight values for the layer, the first number format comprising a first integer of a first predetermined bit-length and a first exponent value that is fixed for the layer;
hardware logic configured to determine, for each of a plurality of layers of the CNN, a second number format for representing data values in the layer based upon a distribution of expected data values for the layer, the second number format comprising a second integer of a second predetermined bit-length and a second exponent value that is fixed for the layer;
the computer system further configured to store the determined number formats in a computer readable storage medium for use in configuring the hardware implementation of a CNN; and
tune the weight values, wherein tuning the weight values comprises:
selecting, for each of a plurality of layers, a subset of the weight values in that layer, wherein the subset is less than all of the weight values in that layer,
quantising, for each of a plurality of layers, the selected subset of weight values in that layer in accordance with the first number format for that layer to generate modified weight values in that layer, wherein the modified weight values in that layer are less than all of the weight values in that layer, and
training the CNN using the modified weight values to generate tuned weight values.

13. The computer system of claim 12, wherein the first and second predetermined bit-lengths are each fixed across a plurality of layers of the CNN.

14. The computer system of claim 12, wherein the computer system is configured to convert the weight values for each of the plurality of layers of the CNN into the first number format and convert input data to the CNN into the second number format, wherein the conversion comprises performing quantisation based upon the first and second number formats.

15. The computer system of claim 14, wherein the quantisation is performed based upon nearest-neighbour rounding.

16. The computer system of claim 14, wherein the computer system is configured to store the converted weight values for each of the plurality of layers of the CNN and data values to the CNN in a memory accessible by the hardware implementation of the CNN or in one or more buffers in the hardware implementation of the CNN.

17. The computer system of claim 12, wherein the computer system is configured to store the weight values for each of the plurality of layers of the CNN, wherein storing the weight values comprises:
storing, for each weight value, a value representing the first integer of that weight value; and
storing, for each layer, a value representing the first exponent value for that layer.

18. The computer system of claim 12, wherein the computer system is configured to store the data values for each of the plurality of layers of the CNN, wherein storing the data values comprises:
storing, for each data value, a value representing the second integer of that data value; and
storing, for each layer, a value representing the second exponent value for that layer.

19. The computer system of claim 12, wherein the weight values in each layer of the CNN are generated by training the CNN using a training data set and wherein the generated weight values are in a floating-point format.

20. A non-transitory computer readable storage medium having stored thereon computer executable instructions that when executed cause at least one processor to configure a hardware implementation of a Convolutional Neural Network (CNN), by:
determining, for each of a plurality of layers of the CNN, a first number format for representing weight values in the layer based upon a distribution of weight values for the layer, the first number format comprising a first integer of a first predetermined bit-length and a first exponent value that is fixed for the layer;
determining, for each of a plurality of layers of the CNN, a second number format for representing data values in the layer based upon a distribution of expected data values for the layer, the second number format comprising a second integer of a second predetermined bit-length and a second exponent value that is fixed for the layer;
storing the determined number formats in a computer readable storage medium for use in configuring the hardware implementation of a CNN; and
tuning the weight values, the tuning comprising:
selecting, for each of a plurality of layers, a subset of the weight values in that layer, wherein the subset is less than all of the weight values in that layer,
quantising, for each of a plurality of layers, the selected weight values in that layer in accordance with the first number format for that layer to generate modified weight values in that layer, wherein the selected weight values in that layer are less than all of the weight values in that layer, and
training the CNN using the modified weight values to generate tuned weight values.

* * * * *